May 17, 1966 K. P. JOHNSON 3,252,015
COMBINED THERMIONIC CONVERTER AND RADIATOR
Filed Feb. 21, 1961 4 Sheets-Sheet 1

INVENTOR.
KENNETH P. JOHNSON
BY
D. Gordon Angus
ATTORNEY

May 17, 1966 K. P. JOHNSON 3,252,015
COMBINED THERMIONIC CONVERTER AND RADIATOR
Filed Feb. 21, 1961 4 Sheets-Sheet 3

INVENTOR.
KENNETH P. JOHNSON

BY
ATTORNEY

May 17, 1966     K. P. JOHNSON     3,252,015
COMBINED THERMIONIC CONVERTER AND RADIATOR
Filed Feb. 21, 1961     4 Sheets-Sheet 4

INVENTOR.
KENNETH P JOHNSON
BY
ATTORNEY

United States Patent Office 3,252,015
Patented May 17, 1966

3,252,015
COMBINED THERMIONIC CONVERTER
AND RADIATOR
Kenneth P. Johnson, Diablo, Calif., assignor to Aerojet-General Corporation, Azusa, Calif., a corporation of Ohio
Filed Feb. 21, 1961, Ser. No. 90,792
1 Claim. (Cl. 310—4)

This invention relates generally to thermionic converters and more particularly to a thermionic converter powered by a nuclear reactor.

Concurrent developments in the technology of high temperature nuclear reactors and thermionic converters have suggested a combination of the two in areas, such as space application, where an electric power source having a long life and few moving parts is desirable.

To implement this suggested combination, it has been proposed to build a thermionic converter in the core of a nuclear reactor by constructing each nuclear fuel element with a double wall jacket, the inner wall to be the cathode heated by a fuel element and the outer wall to be the anode cooled by a conventional coolant. With this arrangement, an electrical potential would form between the cathode and anode in a manner well known in the art. The anode coolant would be circulated to an external radiator where waste heat is rejected to space by direct radiation.

There are, however, a number of difficulties with this approach. This is because heavy nuclear radiation shielding is necessary between the reactor and the vehicle pay load. This "shadow" shield weight is proportional to the reactor diameter squared. Consequently, any disturbance of the reactor core geometry such as would be caused by the introduction of thermionic converters around the fuel elements would cause an increase in the minimum critical reactor size. This would require a further disproportionately large increase in shadow shield weight.

In addition, thermionic converters are relatively low energy density devices. In order to incorporate them within the restricted size limitations of the core of the reactor, it is necessary to operate them at a high cathode current density (20 watts/cm.$^2$ has been proposed). To provide this electrical power density, the wall surrounding the fuel elements and serving as the cathode would have to be constructed from a material which can supply the increased electron emission. The materials so far used for this purpose function in the temperature range from 3300° to 3800° F. Consequently the nuclear fuel elements must operate at a high temperature which adversely affects the operating life.

Besides this, the efficiency of this arrangement is poor when electrical load requirements are low. The reason is that the thermionic converters which can supply the required electrical power at full load are extremely sensitive to operating temperature, and cathode materials which are good emitters at temperatures in the 3300° to 3800° F. temperature range do not even emit at lower temperatures. Consequently when electrical power requirements are low, the reactor must still operate at a high temperature to permit the thermionic converter to function. This high temperature is wasteful of fuel.

It is apparent that it would be desirable to combine the thermionic converter and nuclear reactor in such a way that the thermionic converter is in spaced relation to the core to avoid the above mentioned difficulties. In addition, from the standpoint of space application, it would be particularly desirable if such a combination could be affected without causing any substantial weight increase over the weight of the nuclear reactor power plant system alone.

What is needed, therefore, and comprises an important object of this invention, is a nuclear reactor combined with a thermionic converter and having all the above described desirable features.

The invention in its broadest aspect comprises modifying the radiator of a nuclear reactor by providing the radiator tubes with an inner and outer wall. The inner and outer walls are in spaced relation and are electrically insulated from each other. With this arrangement, when the coolant fluid from the nuclear reactor, which is at a temperature in the neighborhood of 2000° F., enters the radiator tubes the inner wall becomes heated and rises to a higher temperature than the outer wall. This temperature difference produces a voltage between the inner and outer walls in accordance with thermionic principles. The formation of a space charge can be prevented by either close spacing between the cathode and anode as in the vacuum diode or by introducing a neutral plasma such as cesium into the cavity. Both of these techniques are well known in the state of the art.

Other objects of the invention will become more apparent when read in the light of the accompanying drawings and specification wherein.

Figure 1:
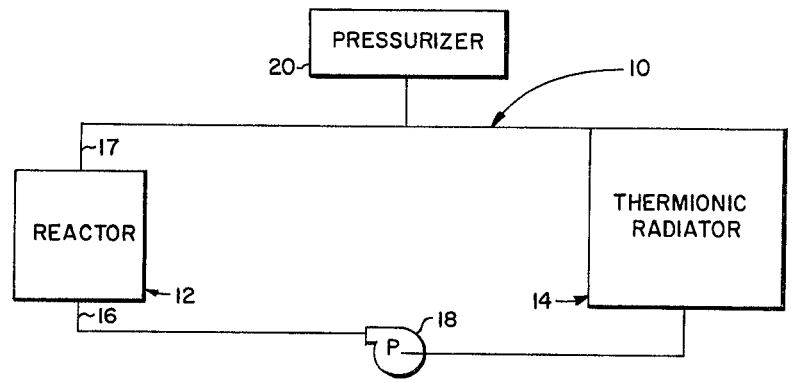
FIG. 1 is a schematic diagram showing a combination of a nuclear reactor and a combined thermionic converter and radiator.

Referring now to FIG. 1 of the drawing, a nuclear thermionic radiator system indicated generally as 10 includes a nuclear reactor 12, a combined thermionic converter and a radiator 14, and conduits 16 and 17. These conduits are connected between the nuclear reactor 12 and the radiator 14 forming, thereby, a closed loop. A coolant fluid flows through conduits 16 and 17, radiator 14, and the core of the nuclear reactor. This coolant fluid is driven by a pump 18, and a pressurizer 20 communicates with conduit 17 to prevent the high temperature from boiling or vaporizing the coolant.

Figure 6:
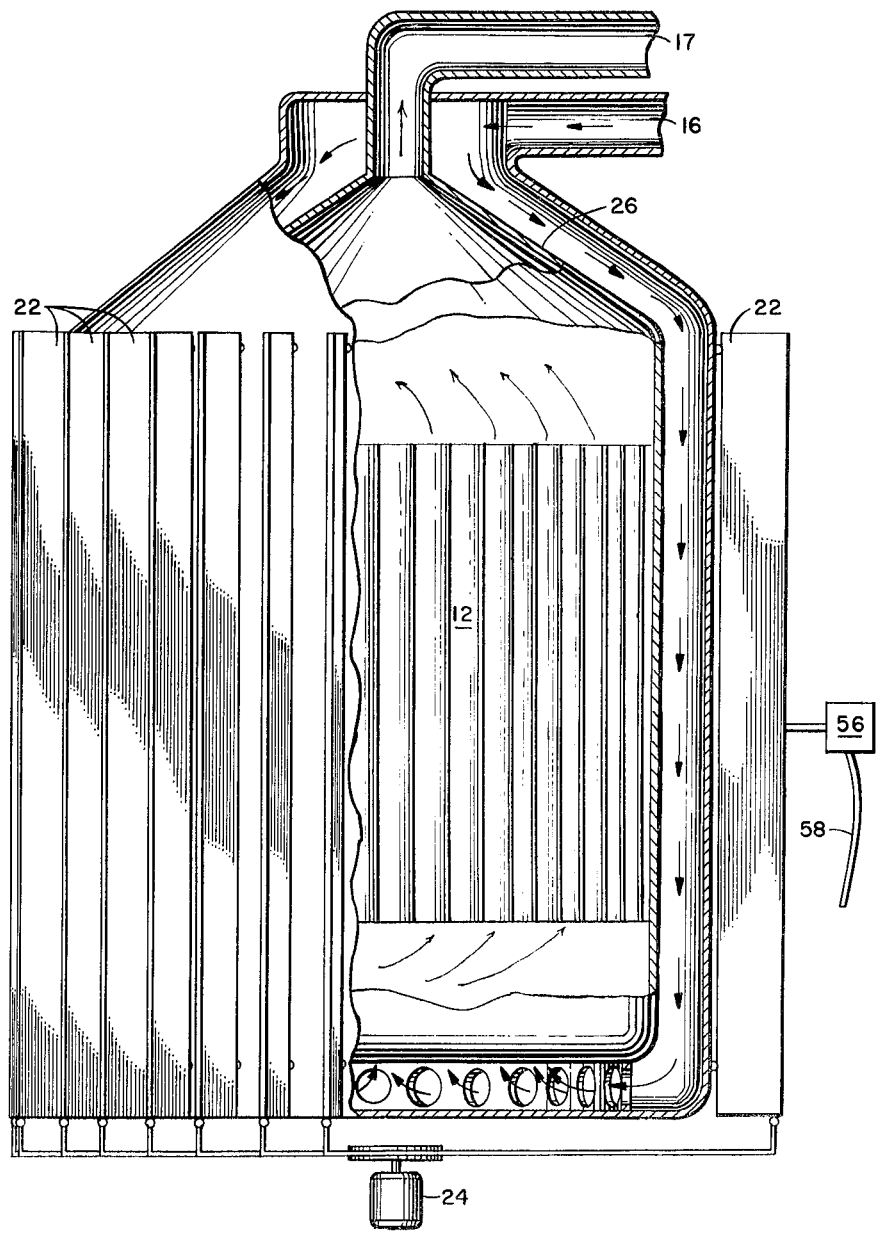
FIG. 6 shows the flow of a coolant fluid through a nuclear reactor.

Reflectors 22 which regulate leakage neutrons may be moved by a motor 24, providing one means for controlling the fission rate of the reactor, in a manner well known in the art (see FIG. 6). The reactor core is mounted inside of jacket 26. The coolant enters jacket 26 through conduit 16 and flows around the sides of the reactor and through the reactor core. The nuclear fission in the reactor heats the coolant so that when it leaves jacket 26 through exit conduit 17, it has a temperature of around 2000° F.

Figure 3:
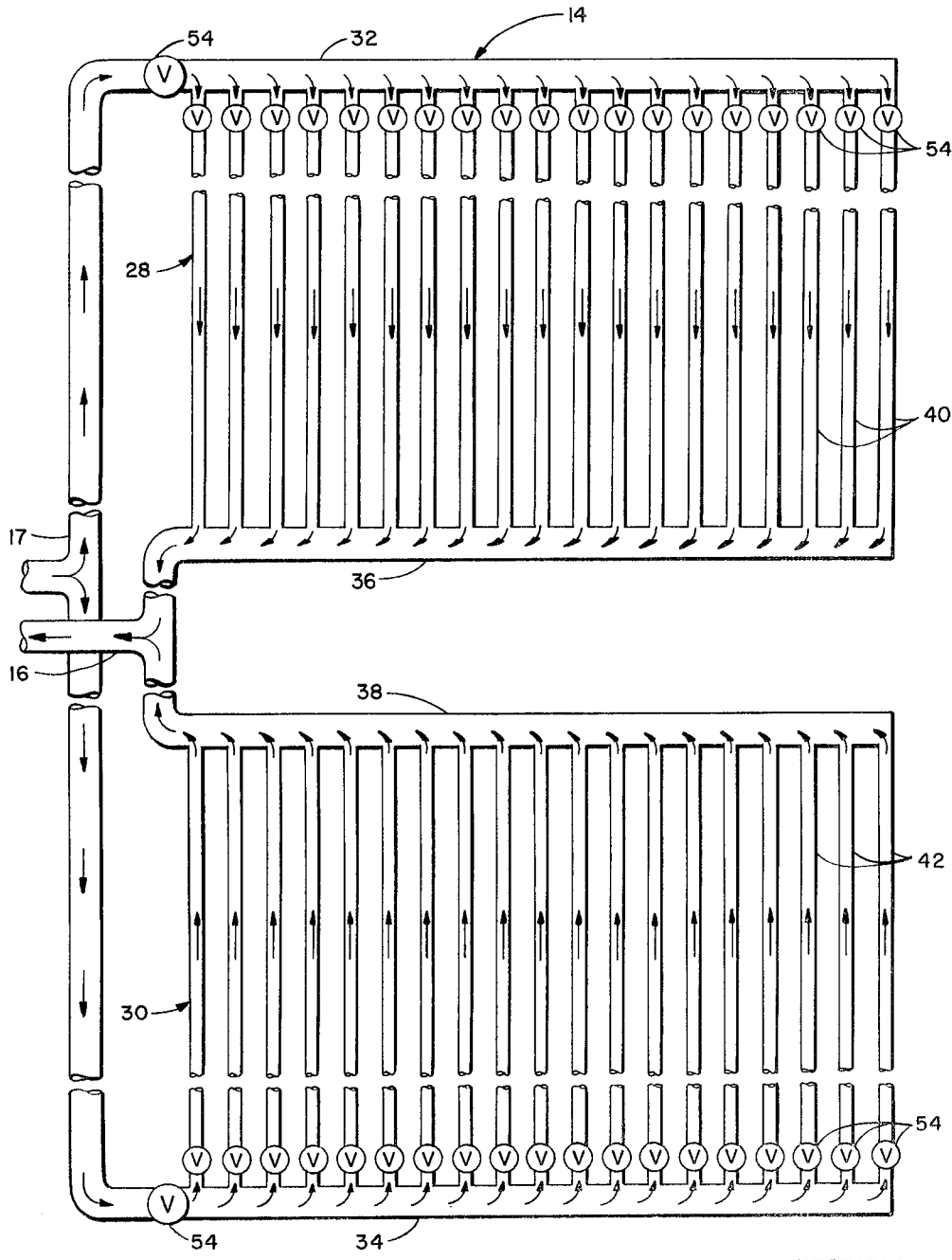
FIG. 3 is an enlarged plan view showing a combined thermionic converter and a radiator.

After leaving the reactor, the heated coolant flows through the radiator 14. As best seen in FIG. 3 and for reasons to become apparent below, the radiator 14 is divided into separate parts or banks 28 and 30, which may be widely separated. These banks are provided with inlet conduits 32 and 34 and outlet conduits 36 and 38 respectively.

A series of double wall tubes 40 are connected between inlet conduit 32 and the outlet conduit 36 in bank 28, and another series of double wall tubes 42 are connected between the inlet conduit 34 and the outlet conduit 38 in bank 30. With this arrangement, it is apparent that the action of pump 18 in driving the coolant through the core of reactor 12 causes the heated coolant to flow via conduit 17 to radiator 14 and through the double wall tubes 40 and 42 in banks 28 and 30.

It is noted that in any power supply system, a radiator of some sort is necessary to reject waste heat and thus maintain the proper temperature relationship between the various components of the system. Consequently, a nuclear power system for use in space application would also require a radiator so that the thermionic radiator 14 disclosed in this invention is not an additional unit, and does not impose an appreciable weight penalty. With this in mind, it can be seen that an important feature of this invention resides in the additional utilization of equipment characteristic of any nuclear system for the direct generation of electricity. In particular, modification of tubes 40 and 42 which, in a somewhat similar form, are present in the nuclear system anyway, converts these tubes into thermionic generators.

Figure 4:
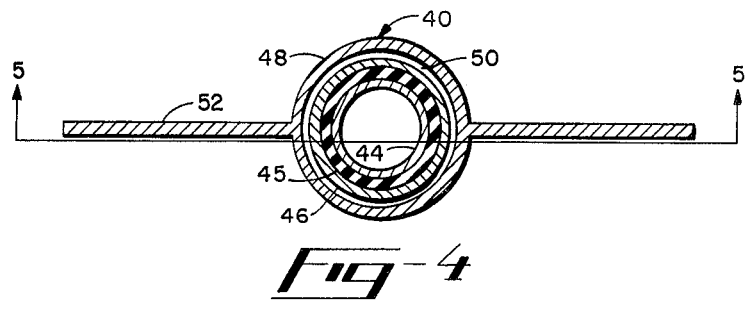
FIG. 4 is a cross-section taken on the line 4—4 of FIG. 5.

To do this, as best seen in FIGURE 4, each of the tubes 40 or 42 (which are dscribed as double wall tubes) comprise a central thin wall tube 44 surrounded by a concentric electrical insulation wall 45, a tubular wall 46 (cathode), hereinafter referred to as inner wall 46, and a concentric outer tubular wall 48 (anode) electrically insulated from inner wall 46 and in spaced relationship thereto. The space 50 between the inner wall 46 and the outer wall 48 can be evacuated with a small gas (.0004") from cathode to anode or the gap made larger (.02") and a small amount of cesium vapor introduced for reasons to become apparent below.

Figure 5:
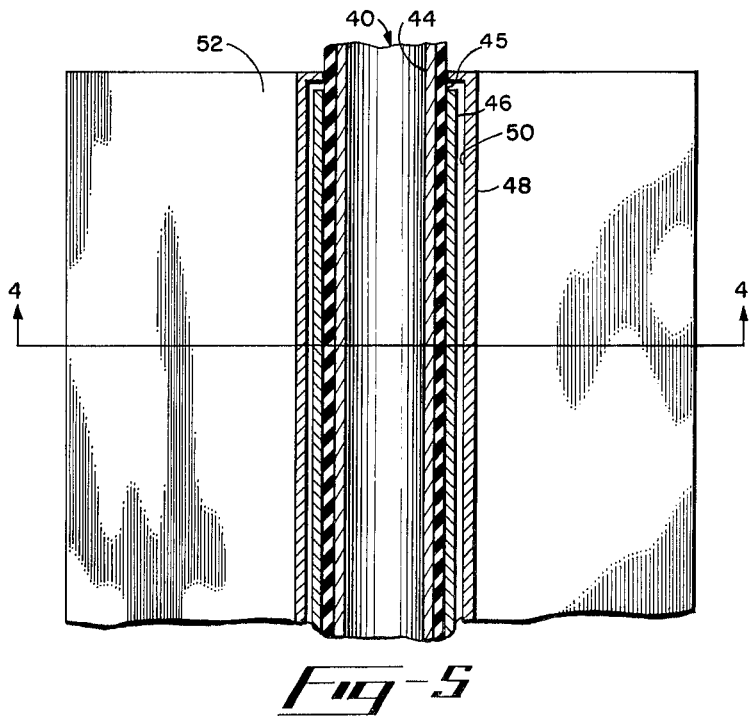
FIG. 5 is a cross-section taken on the line 5—5 of FIG. 4.

With this arrangement, a heated coolant flowing through tubes 40 and 42 heats the inner walls 46 to a temperature in the neighborhood of 2000° F. The energy in walls 46 is radiated to the outer walls 48 which serve as a radiating surface and re-radiate the part of this heat energy not converted to electricity into space. Consequently, the temperature of the outer wall may be in the neighborhood of 1300° F. To better control the temperature of the outer wall, enlarged radiator fins 52 may be attached thereto (see FIG. 5). Both the inner wall 46 and the outer wall 48 may conveniently be made of a material with a high melting point and a suitable working function, such as barium impregnated tungsten.

With this arrangement and with the cesium vapor introduced into the avecuated space 50 to prevent the formation of a space charge and to adjust the work function of the inner and outer walls, a potential difference develops between the inner wall 46 and the outer wall 48 in accordance with well known thermoionic principles. Consequently, the inner wall 46 may be described as a cathode wall and the outer wall 48 may be described as an anode wall. These potential sources in each bank may be connected in a series parallel array to provide a more suitable voltage and current level. For space application, the outer or anode wall is thickened to provide meteorite protection, but some sort of thickened wall would be necessary for any radiating tube in a space environment. Consequently, thickening the anode wall does not impose an added weight penalty and increases the potential life of the thermionic system. The size of the radiator is large in comparison to the space available in the reactor core. This decreases the power density requirements from the thermionic converter. Consequently the cathodes may be formed from a material such as tungsten and barium which is a low flux material but which operates at a lower temperature than high flux materials. With this arrangement, the thermionic converters will function at cathode temperatures around 2000° F., so that the temperature in the nuclear reactor can be decreased accordingly, thereby increasing the useful life of the system.

Electrically operated valves 54 may be mounted in each of the tubes 40 and 42 and in conduits 32 and 34 to cut off or lessen the flow of the coolant to any desired double wall tube or to an entire bank of tubes. With this arrangement, the loss of coolant due to tube rupture caused by meteorite impact or launching damage can be controlled so that the nuclear power plant can continue to operate. In addition, a break in a tube destroying the electrical series connection of the tubes in a bank will not completely cut off the power output of the thermionic radiator because the voltage output from the other bank of tubes might remain intact, permitting continued utilization of the thermionic converter at a lower power output. Besides this, by dividing a thermionic radiator into a series of banks, a very long operating life for the system is possible by providing means for automatically switching the voltage supply from one bank to another at periodic intervals.

In space application, the electrical power requirement may vary. When this happens, it is desirable to decrease the fission rate in the reactor to permit a more efficient utilization of the nuclear fuel. The thermionic radiator 14 described above is well adapted to take advantage of any decrease in power requirements because it can operate efficiently when the fission rate is decreased. To do this, it is necessary that the thermionic radiator be adjusted so that the decreased fission rate in the reactor does not result in a drop in the temperature of the coolant fluid leaving the core of the reactor through conduit 17. This is essential because the thermionic converters will function only when the temperature of the coolant fluid is raised to around 2000° F. At the same time, it is desirable from the point of view of simplicity and reliability to maintain a constant pumping rate through the reactor regardless of power requirements. It is apparent, therefore, that if the fission rate is reduced and the pumping rate is held constant, the temperature of the coolant in the outlet conduit 17 may be held constant by cutting off the flow of the coolant through one or more of the radiating tubes 40 or 42.

This can be done through the actuation of selected electrically operated valves 54 in tubes 40 and 42. The voltage output from the thermionic converter can be tied in with the fission rate of the nuclear reactor by providing the electrical valves 54 with some sort of control which is responsive to the movement of the fission rate control element (in this case, the reflectors 22). Since the reflectors 22 must be moved to control fission rate in the reactor, this movement can be used (by a suitable mechanical linkage, for example) to operate selected electrical valves 54 in the tubes 40 and 42 through a control unit indicated generally by 56 (see FIG. 6). This control unit may be connected to the electrical valves 54 by means of a control cable 58.

In this way, when electrical power requirements are decreased, the reflectors 22 are moved in such a way as to decrease the fission rate in a nuclear reactor and thereby conserve fuel. This movement of reflectors 22 produces a response in control unit 56 which operates selected electrical valves 54 and prevents the flow of coolant through their double wall tubes. Since there is no appreciable heat loss through the closed tubes, the heat radiated from the thermionic radiator 14 is decreased. As a result, the temperature drop between the outlet conduit 17 and the inlet conduit 16 is lessened. Since the temperature of the coolant entering the core of the nuclear reactor will now be raised in comparison to its temperature during full power operation, the reduced fission rate in a nuclear reactor is still sufficient to maintain the temperature of the coolant at the outlet conduit 17 at a constant level.

Figure 2:
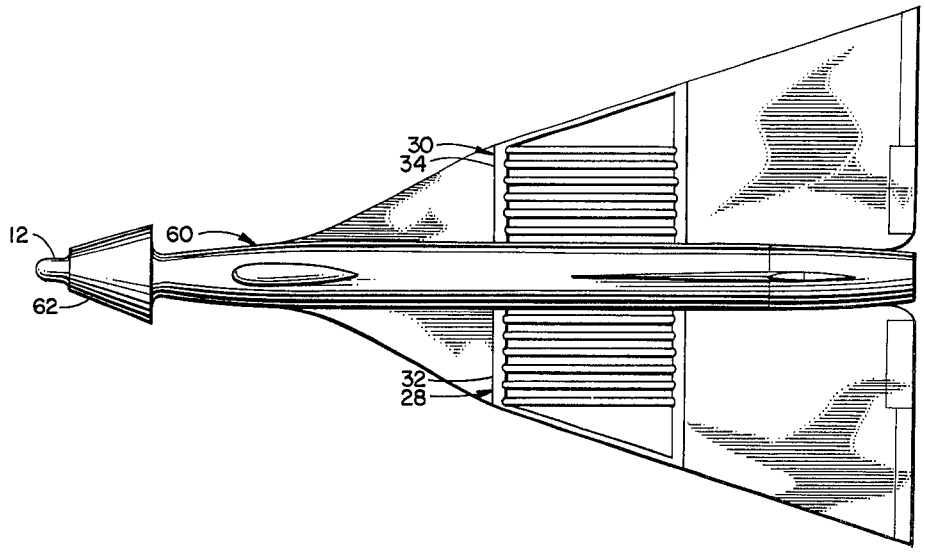
FIG. 2 shows a possible configuration of a nuclear reactor and a combined thermionic converter and radiator on a combined air and space vehicle.

FIG. 2 discloses an embodiment of the nuclear thermionic radiator system mounted in a space vehicle indicated generally at 60. The nuclear reactor 12 is preferably positioned at one end of the vehicle and a shadow shield 62 is positioned between the nuclear reactor and the remainder of the body of the vehicle to prevent radiation damage. The banks 28 and 30 of the thermionic radiator 14 may be mounted as shown in the drawing. It is noted that the banks 28 and 30 of radiator 14 can be part of an aerodynamic surface or can serve as a structural support for an aerodynamic surface if the space vehicle is used for trans-atmospheric purposes. Since a radiator of some sort is necessary for the nuclear reactor and since an aerodynamic surface may be necessary for a vehicle penetrating an atmosphere, the combination of the radiator, thermionic converter and aerodynamic surface in one structure is accomplished without imposing any substantial weight penalty.

Obviously, many modifications of the present invention are permissible in the light of the above teachings. It is, therefore, to be understood that the invention may be practiced other than as described and still remain within the scope of the appended claim.

I claim:

A combined thermionic converter and radiator comprising an inlet conduit and an outlet conduit, a plurality of double wall tubes, each of said double wall tubes comprising an innermost composite tubular wall and an electrically insulated tubular outer wall; said composite tubular wall including a central thin wall tube, an electrical insulation wall concentrically arranged about said thin wall tube, and a tubular inner wall concentrically arranged about said electrical insulation wall; said inner wall being spaced inwardly of said outer wall in each of said double wall tubes, said double wall tubes being connected between said inlet conduit and said outlet conduit, said inlet conduit adapted to receive a heated fluid which flows therefrom through said central thin wall tubes of the composite tubular walls of said double wall tubes and out through the outlet conduit whereby said inner walls of said double wall tubes are heated and serve as cathode walls, the outer walls of said double wall tubes comprising radiating surfaces so that when heated fluid flows through said central thin wall tubes, heat radiated to the outer walls from the inner walls is re-radiated into space whereby the temperature of the outer walls is lower than the temperature of the inner walls so that the outer walls serve as anode walls, and means associated with said double wall tubes for substantially preventing the formation of a space charge between said inner and outer walls whereby when a heated fluid flows through said central thin wall tubes, a potential difference develops between said cathode walls and anode walls, permitting electrons to flow.

References Cited by the Examiner

UNITED STATES PATENTS

| | | | |
|---|---|---|---|
| 2,530,907 | 11/1950 | Pack | 310—4 |
| 2,671,817 | 3/1954 | Groddeck | 310—4 X |
| 2,759,112 | 8/1956 | Caldwell | 310—4 |
| 2,980,819 | 4/1961 | Feaster | 310—4 |
| 3,054,914 | 9/1962 | Hotsopoulos et al. | 310—4 |
| 3,093,567 | 6/1963 | Jablouski et al. | 176—52 |

FOREIGN PATENTS 1,242,179  8/1960  France.

OTHER REFERENCES

Westinghouse Engineer, July 1960, pp. 105, 106, 107 of an article by S. Way.

REUBEN EPSTEIN, *Primary Examiner.*

CARL D. QUARFORTH, *Examiner.*